US006775292B1

United States Patent
Kothapally

(10) Patent No.: US 6,775,292 B1
(45) Date of Patent: Aug. 10, 2004

(54) METHOD FOR SERVICING OF MULTIPLE QUEUES CARRYING VOICE OVER VIRTUAL CIRCUITS BASED ON HISTORY

(75) Inventor: Srinivas Kothapally, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/490,318

(22) Filed: Jan. 24, 2000

(51) Int. Cl.[7] .............................................. H04L 12/28
(52) U.S. Cl. .................. 370/412; 370/395.4; 370/395.7
(58) Field of Search ................................ 370/229, 230, 370/232, 234, 389, 395.1, 395.4, 395.64, 395.7, 395.71, 412, 413, 415

(56) References Cited

U.S. PATENT DOCUMENTS

| | | |
|---|---|---|
| 4,430,712 A | 2/1984 | Coulson et al. |
| 4,849,968 A | 7/1989 | Turner |
| 4,943,999 A | 7/1990 | Ardon |
| 5,014,265 A | 5/1991 | Hahne et al. |
| 5,157,654 A | 10/1992 | Cisneros |
| 5,224,099 A | 6/1993 | Corbalis et al. |
| 5,274,768 A | 12/1993 | Traw et al. |
| 5,295,134 A | 3/1994 | Yoshimura et al. |
| 5,303,078 A | 4/1994 | Brackett et al. |
| 5,311,509 A | 5/1994 | Heddes et al. |
| 5,313,454 A | 5/1994 | Bustini et al. |
| 5,345,438 A | 9/1994 | Ozaki |
| 5,359,592 A | 10/1994 | Corbalis et al. |
| 5,365,590 A | 11/1994 | Brame |

(List continued on next page.)

FOREIGN PATENT DOCUMENTS

EP 0706298 4/1996

OTHER PUBLICATIONS

Moreno, Wilfrido. "Field Programmable Gate Array Design for an Application Specific Signal Processing Algorithms". IEEE. Mar. 2–4, 1998. pp. 222–225.*
Park et al. "Implementation of the ATM Adaptation Layer for VTOA Services". IEEE Multimedia Computing and Systems. Jun. 3, 1997–Jun. 6, 1997. pp. 95–100.*
Chi et al. "Starvation Prevention for Arbiters of Crossbars with Multi–Queue Input Buffers". IEEE Compcon Spring. 1994. pp. 229–297.*
K. Genda, et al. "A 160 GB/s ATM Switch Using Internal Speed–Up Crossbar Switch Architecture," Electronics and Communications in Japan, Part I—Communications, vol. 80, No. 9, pp. 68–78 (Sep. 1997).
M. Veeraraghavan, et al., "Parallel Connection Control (PCC) Algorithm for ATM Networks," 1996 IEEE International Conference on Communications (ICC), Converging Technologies for Tomorrow's Applications, Dallas, vol. 3, pp. 1635–1641.
T.F. Brown, "Distributed Control of a Broadband Local Access Switch," World Prosperity Through Communications, Boston, vol. 3, pp. 1221–1225 (Jun. 11–14, 1989).

(List continued on next page.)

*Primary Examiner*—Chi Pham
*Assistant Examiner*—Derrick W Ferris
(74) *Attorney, Agent, or Firm*—Blakely, Sokoloff, Taylor & Zafman LLP

(57) ABSTRACT

In one embodiment, a method including transmitting data cells through a plurality of queues to an input of a processor is disclosed. The method includes transmitting data cells from an output of the processor to corresponding virtual circuits. The amount of data transmitted through each queue is computed. The cumulative amount of data transmitted through all queues is also computed. For each queue, a ratio of the amount of data transmitted through the queue to the cumulative amount of data transmitted through all queues is determined. The method also determines an amount of processor time for each queue using the ratio for the queue.

27 Claims, 4 Drawing Sheets

U.S. PATENT DOCUMENTS

| | | | |
|---|---|---|---|
| 5,379,297 A | 1/1995 | Glover et al. | |
| 5,412,655 A | 5/1995 | Yamada et al. | |
| 5,434,848 A | 7/1995 | Chimento, Jr. et al. | |
| 5,469,433 A | 11/1995 | McAuley | |
| 5,499,238 A | 3/1996 | Shon | |
| 5,517,643 A | 5/1996 | Davy | |
| 5,530,698 A | 6/1996 | Kozaki et al. | |
| 5,537,611 A | 7/1996 | Rajagopal et al. | |
| 5,539,899 A | 7/1996 | Huynh et al. | |
| 5,541,912 A | 7/1996 | Choudhury et al. | |
| 5,541,919 A | 7/1996 | Yong et al. | |
| 5,542,068 A | 7/1996 | Peters | |
| 5,546,389 A | 8/1996 | Wippenbeck et al. | |
| 5,548,587 A | 8/1996 | Bailey et al. | |
| 5,550,823 A | 8/1996 | Irie et al. | |
| 5,555,264 A | 9/1996 | Sallberg et al. | |
| 5,557,604 A | 9/1996 | Usumi et al. | |
| 5,557,607 A | 9/1996 | Holden | |
| 5,568,477 A | 10/1996 | Galand et al. | |
| 5,570,362 A | 10/1996 | Nishimura | |
| 5,584,015 A | 12/1996 | Villette et al. | |
| 5,592,530 A | 1/1997 | Brockman et al. | |
| 5,600,820 A | 2/1997 | Johnston | |
| 5,617,416 A | 4/1997 | Damien | |
| 5,625,625 A | 4/1997 | Oskouy et al. | |
| 5,633,861 A | 5/1997 | Hanson et al. | |
| 5,649,089 A | 7/1997 | Kilner | |
| 5,663,949 A | 9/1997 | Ishibashi et al. | |
| 5,678,006 A | 10/1997 | Valizadeh et al. | |
| 5,680,582 A | 10/1997 | Slayden | |
| 5,701,495 A | 12/1997 | Arndt et al. | |
| 5,704,047 A | 12/1997 | Schneeberger | |
| 5,742,606 A | 4/1998 | Iliadis et al. | |
| 5,742,765 A | 4/1998 | Wong et al. | |
| 5,765,032 A | 6/1998 | Valizadeh | |
| 5,768,275 A | 6/1998 | Lincoln et al. | |
| 5,787,070 A | 7/1998 | Gupta et al. | |
| 5,793,747 A | 8/1998 | Kline | |
| 5,796,735 A | 8/1998 | Miller et al. | |
| 5,812,527 A | 9/1998 | Kline et al. | |
| 5,818,843 A | 10/1998 | Virdee et al. | |
| 5,828,651 A | 10/1998 | Jang et al. | |
| 5,838,677 A | 11/1998 | Kozaki et al. | |
| 5,844,901 A | 12/1998 | Holden et al. | |
| 5,850,395 A | 12/1998 | Hauser et al. | |
| 5,854,911 A | 12/1998 | Watkins | |
| 5,875,352 A | 2/1999 | Gentry et al. | |
| 5,898,688 A | 4/1999 | Norton et al. | |
| 5,901,147 A | 5/1999 | Joffe | |
| 5,923,656 A | 7/1999 | Duan et al. | |
| 5,970,064 A | 10/1999 | Clark et al. | |
| 5,974,466 A | 10/1999 | Mizutani et al. | |
| 5,978,856 A | 11/1999 | Jones | |
| 5,982,783 A | 11/1999 | Frey et al. | |
| 5,999,518 A | 12/1999 | Nattkemper et al. | |
| 5,999,533 A | 12/1999 | Peres et al. | |
| 6,008,805 A | 12/1999 | Land et al. | |
| 6,011,775 A | 1/2000 | Bonomi et al. | |
| 6,028,844 A | 2/2000 | Hao et al. | |
| 6,034,945 A * | 3/2000 | Hughes et al. | 370/230 |
| 6,058,114 A | 5/2000 | Sethuram et al. | |
| 6,084,880 A | 7/2000 | Bailey et al. | |
| 6,097,807 A | 8/2000 | Leslie et al. | |
| 6,130,878 A | 10/2000 | Charny | |
| 6,185,222 B1 | 2/2001 | Hughes et al. | |
| 6,317,416 B1 * | 11/2001 | Giroux et al. | 370/232 |
| 6,331,981 B1 * | 12/2001 | Harth et al. | 370/395.1 |
| 6,434,612 B1 | 8/2002 | Hughes et al. | |
| 6,526,060 B1 | 2/2003 | Hughes et al. | |
| 6,535,484 B1 | 3/2003 | Hughes et al. | |

OTHER PUBLICATIONS

Sato Fumito, et al., "Functional Elements for Switching Software Based on Object Oriented Paradigm with UPT as an Example," IEICE Transactions on Communications, vol. E75–B, No. 10, pp. 1052–1060 (Oct. 1, 1992).

P. Newman, et al., "Ipsilion's General Switch Management Protocol Specification, Version 1.1," Internet Engineering Task Force, RFC 1987 (Aug. 1996).

P Newman, et al., "General Switch Management Protocol Specification, Version 1.1," Internet Engineering Task Force, Draft (Jun. 1996).

The ATM Forum Technical Committee, "Integrated Local Management Interface (LMI) Specification, Version 4.0," ATM Forum document No. af–ilmi–0065.000 (Sep. 1996).

M. Ahmed et al., "Definitions of Managed Objects for ATM Management Version 8.0 using SMIv2," Internet Engineering Task Force, RFC 1695 (Aug. 1994).

J. Case, et al., Structure of Management Information for Version 2 of the Simple Network Management Protocol (SMNPV2), Internet Engineering Task Force, RFC 1902 (Jan. 1996).

T. Brown, "Definitions of Managed Objects for the SONET/Sdh Interface Type," Internet Engineering Task Force, RFC 1595 (Mar. 1994).

P. Almquist, et al., "Type of Service in the Internet Protocol Suite," Internet Engineering Task Force, RFC 1349 (Jul. 1992).

Louie Fourie, "Switch Management Interface Funtional Specification," Revision 1.1, pp. 1–31 (Apr. 25, 1996).

Stratacom BPX Reference Manual, Release 8.2 EDQ Draft (May 30, 1996).

Cisco BPX 8600 Series Reference, Release 9.1, pp. v–xxx, 1–1 to 2–18, and 9–1 to 9–60 (May 1988).

Hashemi et al. "A General Purpose Cell Sequencer/Scheduler for ATM Switches", IEEE, 5/97, p. 29–37.

Chao et al. "Design of Virtual Channel Queue in an ATM Terminal Adaptor," IEEE 6/92, p. 294–302.

Kawahara, et al., "Performance Evaluation of Selective Cell Discard Schemes in ATM Networks," IEEE INFOCOM '96: The Conference on Computer Communications, vol. 3, pp. 1054–1061, Mar. 24–28, 1996.

Vumiokamatani, et al., "Dynamic Threshold Cotnrol for Shared Buffer ATM Switching," Shingaku Giho, Technical Report of IEICE, SSE95–12, PTO 98–3836, pp. 1–20, May 1995.

The IPX Product Family System Description, pp. 1–114 (Stratacom, Inc. 1990).

BPX Multi–Service ATM Brochure (Stratacom, Inc. 1994).

B. Phillips, "Data Transmission and Switching," Data Communications, pp. 43–45 (McGraw–Hill Jan. 1994).

C.M. Chen and N. Roussopoulos, "The Implementation and Performance Evaluation of the ADMS Query Optimizer: Integrating Query Result Caching and Matching," Lecture Notes in Computer Science, Advances in Database Technology—EDBT '94, pp. 323–336 Cambridge, United Kingdom (Mar. 1994).

"Multi–Access First–In–First–Out Queue Using 370 Compare and Swap," IBM Technical Disclosure Bulletin, vol. 36, No. 2, pp. 327–330 (Feb. 1993).

The ATM Forum Technical Committee, "Traffic Management Specification Version 4.0", ATM Forum document No. af–tm–0056.000, Apr. 1996.

The ATM Forum Technical Disclosure Committee, "Addendum to Traffic Management V4.0 for ABR parameter negotiation," ATM Forum document No. af–tm–077.000, Jan. 1997.

Hui Zhang, "Service Discipline For Guaranteed Peformance Service in Packet–Switching Networks," Proceedings of the IEEE, vol. 83, No. 10, pp. 1–23 (Oct. 1995).

Jon C.R. Bennett and Hui Zhang, "Why WFQ is Not Good Enough For Integrated Services Networks," Proceedings of NOSSDAV'96 (Apr. 1996).

Jon C.R. Bennett and Hui Zhang, "WF2Q: Worst–case Fair Weighted Fair Queuing," Proceedings IEEE INFOCOMM'96, San Francisco, CA (Mar. 1996).

M. Shreedhar and George Varghese, "Efficient Fair Queuing using Deficit Round Robin," Proceedings of SIGCOMM '95, ACM, Cambridge, MA (1995).

* cited by examiner

METHOD FOR SERVICING OF MULTIPLE QUEUES CARRYING VOICE OVER VIRTUAL CIRCUITS BASED ON HISTORY

FIELD OF THE INVENTION

The invention relates generally to digital networks, and in particular to digital telephone networks.

BACKGROUND

Traditional telephone calls are transmitted simultaneously over a telephone line using time division multiplexing (TDM). The TDM calls can be mapped onto virtual circuits (VCs) and transmitted over an ATM network using Voice over ATM Adaptation Layer 2 (VoAAL2). There can be multiple AAL2 virtual circuits (VCs), each of which can potentially carry multiple multiplexed voice channels.

Voice over AAL2 is becoming increasingly significant as traditional TDM based voice phone calls are mapped to the VCs of cell based ATM networks. One problem with converting the TDM based data into cells and placing the cells on VCs is caused by the current scheduling methods used by the processor to devote time to placing cells onto each VC. Current scheduling methods are inflexible, and result in too much time being spent placing some cells onto VCs, and not enough time spent placing other cells onto VCs. This results in "starvation" for the VCs that the processor neglects to "feed" with cells. The end result is that the voice quality on the starved VCs is degraded because of the inflexible processor scheduling methods.

SUMMARY OF THE INVENTION

In one embodiment, a method including transmitting data cells through a plurality of queues to an input of a processor is disclosed. The method includes transmitting data cells from an output of the processor to corresponding virtual circuits. The amount of data transmitted through each queue is computed. The cumulative amount of data transmitted through all queues is also computed. For each queue, a ratio of the amount of data transmitted through the queue to the cumulative amount of data transmitted through all queues is determined. The method also determines an amount of processor time for each queue using the ratio for the queue.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method for servicing multiple queues carrying voice over virtual circuits is described. For one embodiment, the method includes transmitting data cells representing voice or data telephone traffic through a plurality of queues to a processor, which places the cells on corresponding virtual circuits. For this embodiment, the method includes computing the amount of data transmitted through each queue and computing the cumulative amount of data transmitted through all queues. Then, for each queue, a ratio $R_i$ corresponding to the amount of data transmitted through the given queue, $Rd_i$ divided by the cumulative amount of data transmitted through all queues is determined, such that $$R_i = \frac{Rd_i}{Rd_T}.$$

The amount of time that the processor devotes to processing data from the given queue will be proportional to the ratio $R_i$ for that queue.

One advantage of this method is that the amount of processor time devoted to a given queue is proportional to the amount of data that is transmitted through that queue. Thus, the starvation problem of prior art scheduling methods is reduced. As a result, the voice quality of the phone calls transmitted through the virtual circuits is increased.

For another embodiment, this method is periodically repeated, so that the amount of time a processor spends servicing a given queue dynamically changes as the amount of data transmitted through the queue increases or decreases. This dynamic allocation of processor time is thus an improvement over prior art static scheduling methods, which cannot adapt or change the amount of time a processor devotes to a given queue in response to changed data flow through the queue.

Figure 1:
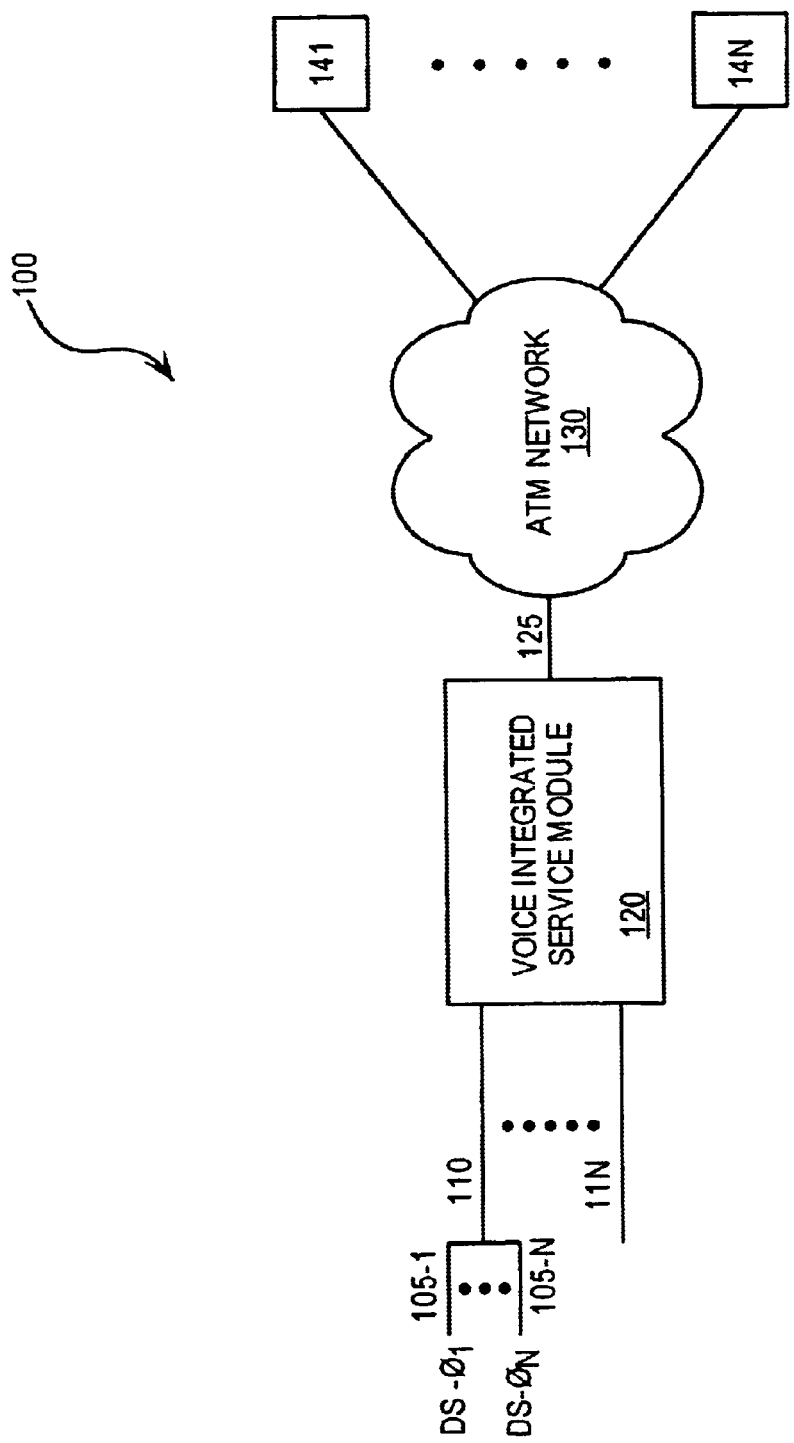
FIG. 1 shows an embodiment of a network.

FIG. 1 shows an embodiment of network 100 that implements the method of the present invention. A signal, such as a phone call or a fax transmission, for example, is carried on a telephone line 105, which may be a digital signal, level 0 (DS-0) line. Twenty-four simultaneous DS-0 signals, DS-$0_1$, . . . DS-$0_{24}$, may be transmitted by a digital signal, level 1 (DS-1) carrier 11$n$, such as a T1 line for example. The T1 line can carry the 24 signals simultaneously using time division multiplexing (TDM). Up to eight T1 lines can be connected to a voice integrated service module (VISM) 120. Thus, a total of 192 phone calls can be simultaneously transmitted through network 100. VISM 120 receives the signals from the T1 lines, maps them on to virtual circuits (VCs), and transmits them to asynchronous transfer mode (ATM) network 130 through trunk 125. The ATM network 130 then transmits the signals to receivers 141, . . . , 14$n$. The ATM network 130 may be a network such as an ATM adaptation layer 2 (AAL2) network.

Figure 2:
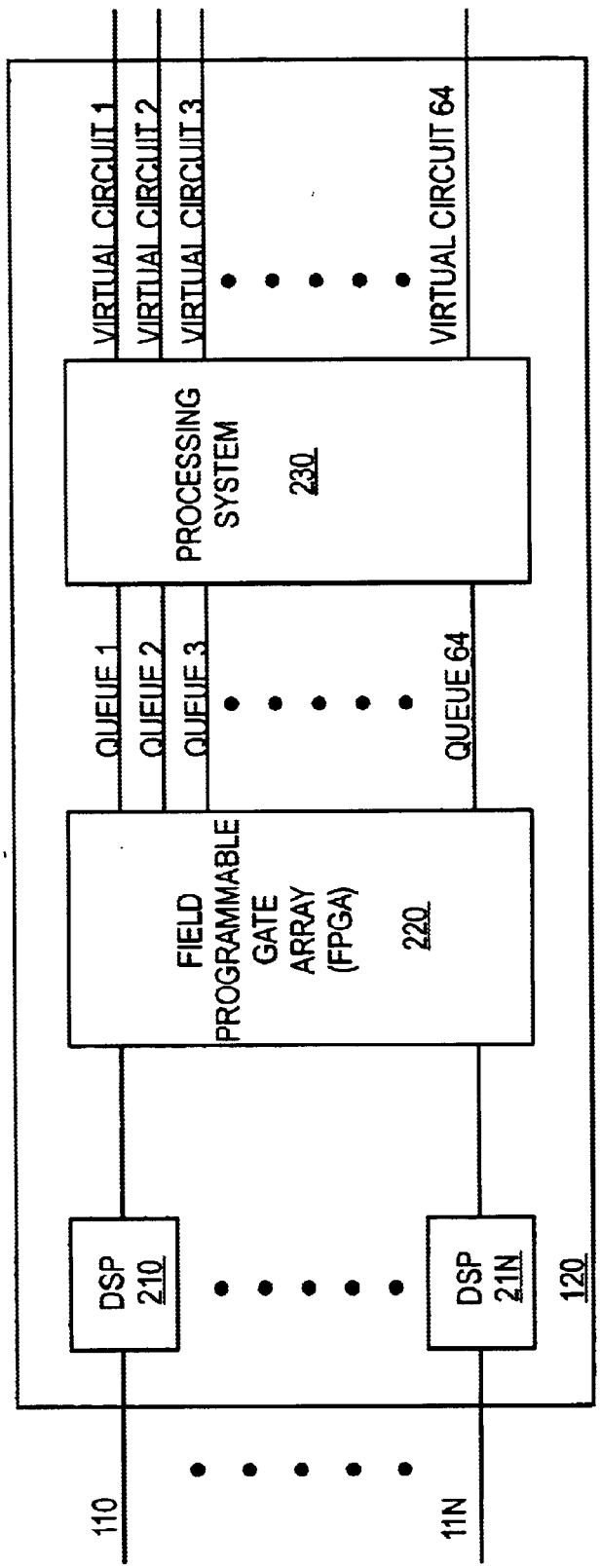
FIG. 2 shows an embodiment of a voice integrated service module.

FIG. 2 shows an embodiment of voice integrated service module (VISM) 120. Signals from eight T1 lines 11$n$ are input into VISM 120. The signals from each T1 line are received by a corresponding digital signal processor (DSP) 210, . . . , 21$n$, which converts the signals into cells. The DSPs then send the cells to field programmable gate array (FPGA) 220. The FPGA outputs each cell on one of 64 queues. Each queue corresponds to a VC, therefore, the FPGA maps each cell onto a VC by outputting the cell onto a corresponding queue. The cells from each queue are received by a processing system 230, which includes a central processing unit (CPU). The processing system 230 outputs the cells onto their corresponding VCs, where the cells are transmitted to ATM network 130 through trunk 125 as shown in FIG. 1.

Each queue may have a different number of cells. For example, queue 1 may have 10 packets, queue 2 may have 5 cells, and queue 3 may have 20 cells. Furthermore, the size of the data contained in each cell may change. For example, a cell that corresponds to a voice phone call may be 10 bytes, but a cell that corresponds to a fax transmission may be 50 bytes. Therefore, if a phone call starts as a voice call, but then changes to a fax transmission, the size of the corresponding cells will increase. Also, the number of cells carried by a queue may dynamically change. For example, if a person is silent during a phone call, then a voice activity detector (VAD) will prevent a digital signal from being generated during the silent period. As a result, corresponding cells will not be generated, and the number of cells on the corresponding queue will decrease. Alternatively, an increase in the number of phone calls results in an increase in the number of cells in at least one of the queues.

Therefore, in VISM 120, which has multiple queues that are serviced by a single CPU, the time spent servicing the individual queues can impact the performance of the system. The time spent servicing each queue must be flexible, because the queues may carry different amounts and sizes of cells representing voice traffic. The size of each cell can vary based on a VAD, or upspeeding of a voice channel from compressed mode to uncompressed mode. Also, the number of voice channels multiplexed on each of the AAL2 VCs can dynamically change which can further vary the data rates, as discussed above. An advantage of the method presented here is dynamically servicing the queues based on the history of the data traffic on the queues. Another advantage is preventing starvation of a queue caused by the CPU spending too much time servicing one or more other queues. Because starvation of a queue is prevented, the degradation of the voice quality of the phone call caused by the delay introduced by the CPU is reduced.

A method of placing cells from the queues onto the AAL2 VCs is based on the amount of data handled on each of the queues and their corresponding AAL2 VCs. The amount of time that the processor spends servicing each queue is proportional to the amount of data that comes through the queue. Furthermore, the amount of time that the processor spends servicing a given queue dynamically and automatically changes, so that the servicing time will remain proportional to the amount of data traffic through the queue.

Figure 3:
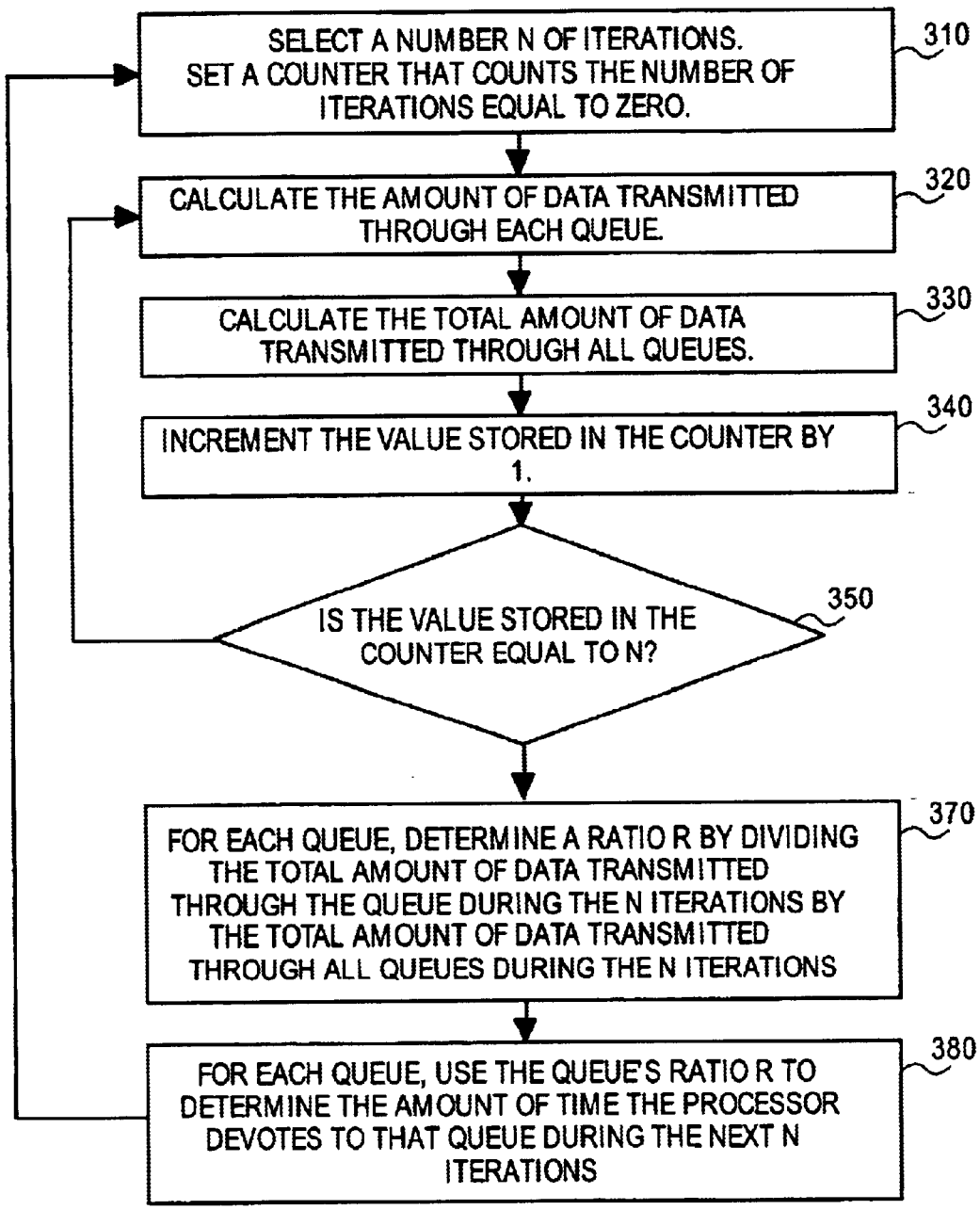
FIG. 3 shows an embodiment of a method of scheduling queues.

FIG. 3 shows an embodiment of a method for scheduling the time spent by the processor servicing each queue. A number of iterations, N, is selected, step 310. An iteration is the amount of time that the processor has to service all of the queues once. For the initial N iterations, the processor services all of the queues for an equal length of time. During a given iteration, the amount of data transmitted through each queue is computed, step 320. The cumulative amount of data transmitted through all queues during the given iteration is also computed, step 330. A counter is incremented by 1, step 340. Steps 320 through 340 are repeated until the value stored in the counter is equal to N, step 350. When the counter is equal to N, the amount of time that the CPU will spend servicing each queue for the next N iterations can be determined.

For each queue$_i$, where$_i$=1 to N, the total amount of data D$_i$ transmitted through a given queue$_i$ during the N iterations is divided by the total amount of data D$_T$ handled by all queues during the N iterations to produce a ratio R$_i$ for each queue$_i$, step 375, such that $$R_i = \frac{D_i}{D_T}.$$

The amount of time that the processor will spend servicing a given queue during the next N iterations is proportional to the ratio R$_i$ for the given queue multiplied by the amount of time that the processor spends servicing all queues, step 380. Thus, the amount of time that the processor spends servicing a given queue is automatically determined as a function of the amount of data transmitted through the queue. The process is then repeated for another N iterations, so that the amount of servicing time that a processor spends on a given queue is dynamically adjusted in response to a change in data traffic through the queue.

By servicing the queues based on the data rates handled in the past N iterations, the scheduling time to service the individual AAL2 queues automatically changes in order to reduce the effects of starvation. This improves the overall system performance, because more time can be spent servicing AAL2 queues which are handling more data than other queues. An advantage of the method shown in FIG. 3 is tuning the servicing time of the several AAL2 queues and their corresponding VCs by the amount of traffic handled by each AAL2 queue.

This AAL2 queue servicing method adapts the processing resources to the traffic pattern, and reduces unknown delays for the delay sensitive voice traffic. Therefore, this method overcomes the problems of prior art round robin scheduling methods, which include unknown delays from delay sensitive voice traffic that cause degradation in voice quality of the phone call.

This method also has advantages over prior art priority based scheduling scheme that use complicated algorithms, which cause real-time delays because of processing time. Unlike prior art priority based scheduling methods, the book keeping involved in this method is minimal and hence does not overburden the processor in terms of real time CPU cycles. Furthermore, unlike the prior art priority based static scheduling schemes, this method is dynamic in changing the servicing time for individual queues based on the traffic pattern.

The method for servicing queues carrying voice over AAL2 virtual channels based on history described herein provides an efficient scheduling method for improving the quality of phone calls transmitted over a VoAAL2 network.

Figure 4:
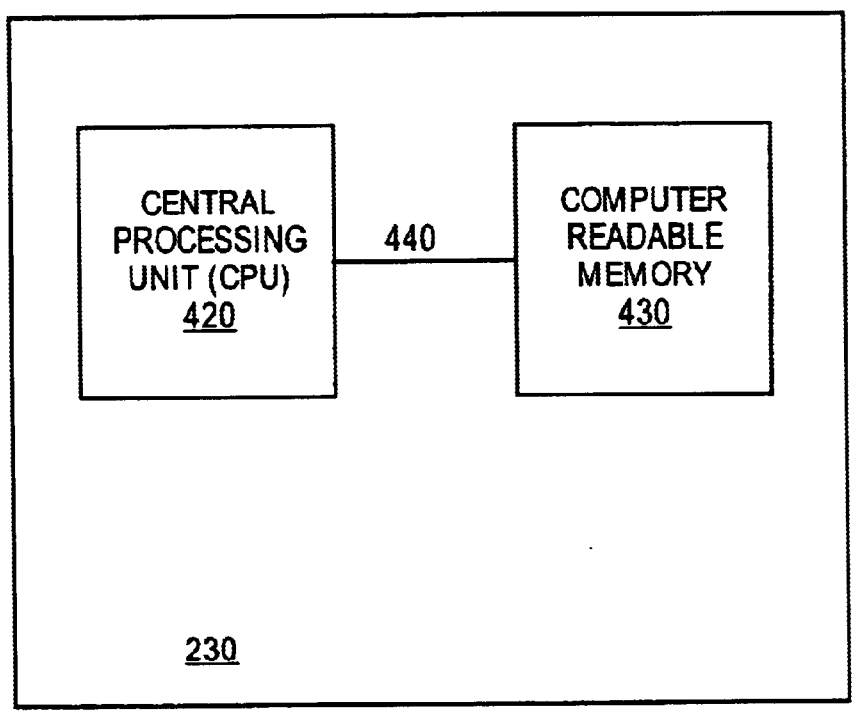
FIG. 4 shows an embodiment of a processing system.

FIG. 4 shows an embodiment of processor 230 that implements the method shown in FIG. 3. Computer readable memory 430 stores computer software instructions which, when executed by the CPU 420, perform the method shown in FIG. 3. The CPU 420 can read and execute the stored software instructions from memory 430 through data bus 440.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   (a) transmitting data cells through a plurality of queues to an input of a processor;
   (b) transmitting the data cells from an output of the processor to corresponding virtual circuits;
   (c) servicing all queues of the plurality of queues for a first iteration;
   (d) computing an amount of data cells transmitted through each queue;
   (e) computing a cumulative amount of data cells transmitted through all queues;

(f) for each queue, determining a ratio of the amount of data cells transmitted through the queue to the cumulative amount of data cells transmitted through all queues;

g) determining an amount of processor time for each queue using the ratio for the queue; and (h) repeating (d) through (g) for another N iterations, where N is equal to or greater than 1.

2. The method of claim 1 wherein determining the amount of processor time comprises multiplying the ratio for the queue by a time period.

3. The method of claim 2 further comprising generating the data cells.

4. The method of claim 3 wherein the data cells are generated by:

receiving time division multiplexed (TDM) signals; and converting the TDM signals to the data cells using a digital signal processor.

5. The method of claim 2 further comprising:

generating a plurality of virtual circuits.

6. The method of claim 5 wherein the virtual circuits are generated by an Asynchronous Transfer Mode network.

7. A computer readable medium containing instructions which, when executed in a processing system, cause the system to:

(a) transmit data cells through a plurality of queues to an input of a processor;

(b) transmit the data cells from an output of the processor to corresponding virtual circuits;

(c) servicing all queues of the plurality of queues for a first iteration;

(d) compute an amount of data cells transmitted through each queue;

(e) compute a cumulative amount of data cells transmitted through all queues;

(f) for each queue, determine a ratio of the amount of data cells transmitted through the queue to the cumulative amount of data cells transmitted through all queues;

(g) determine an amount of processor time for each queue using the ratio for the queue;

(h) repeating (d) through (f) for another N iterations, where N is equal to or greater than 1.

8. The medium of claim 7 wherein the instructions, when executed, determine the amount of processor time by multiplying the ratio for the queue by a time period.

9. The medium of claim 8 wherein the instructions, when executed, further cause the system to generate data cells.

10. The medium of claim 9 wherein the data cells are generated by:

receiving time division multiplexed (TDM) signals; and converting the TDM signals to the data cells using a digital signal processor.

11. The medium of claim 10 wherein the instructions, when executed further cause the system to generate a plurality of virtual circuits.

12. The medium of claim 11 wherein the virtual circuits are generated by an Asynchronous Transfer Mode network.

13. An apparatus comprising:

means for (a) transmitting data cells through a plurality of queues to an input of a processor;

means for (b) transmitting data cells from an output of the processor to corresponding virtual circuits;

means for (c) servicing all queues of the plurality of queues for a first iteration;

means for (d) computing an amount of data transmitted through each queue;

means for (e) computing a cumulative amount of data transmitted through all queues;

for each queue, means for (f) determining a ratio of the amount of data transmitted through the queue to the cumulative amount of data transmitted through all queues;

(g) means for determining an amount of processor time for each queue using the ratio for the queue; and means for repeating (d) through (f) for another N iterations, where N is equal to or greater than 1.

14. The apparatus of claim 13 wherein said means for determining the amount of processor time comprises means for multiplying the ratio for the queue by a time period.

15. The apparatus of claim 14 further comprising means for generating data cells.

16. The apparatus of claim 15 wherein the means for generating the data cells comprises:

means for receiving time division multiplexed (TDM) signals; and means for converting the TDM signals to the data cells.

17. The apparatus of claim 16 further comprising:

means for generating a plurality of virtual circuits.

18. The apparatus of claim 17 wherein the virtual circuits are generated by an Asynchronous Transfer Mode network.

19. An apparatus, comprising:

a plurality of queues; and a processor coupled to (a) receive cells from each of the plurality of queues, the processor to (b) service all queues of the plurality of queues for a first iteration, the processor to (c) compute an amount of cells transmitted through each queue of the plurality of queues and a cumulative amount of cells transmitted through all of the plurality of queue, the processor to (d) determine for each queue a ratio of the amount of cells transmitted through the queue to the cumulative amount of cells transmitted through all queues and (e) determine an amount of processor time for each queue using the ratio for the queue, the processor to repeat (c) through (d) for another N iterations, where N is equal to or greater than 1.

20. The apparatus of claim 19, further comprising a field programmable gate array coupled to the processor to transmit each of the cells to a corresponding queue of the plurality of queues.

21. The apparatus of claim 20, wherein the processor generates a plurality of virtual circuits and the field programmable gate array maps each cell onto a virtual circuit.

22. The apparatus of claim 20, further comprising a plurality of digital signal processors coupled to the field programmable gate array, the plurality of digital signal processors to transmit the cells to the field programmable gate array.

23. The apparatus of claim 22, wherein each of the plurality of digital signal processors receive time division multiplexed (TDM) signals and convert the TDM signals to the cells.

24. The method of claim 1, wherein each of the plurality of queues is an AAL2 queue.

25. The medium of claim 7, wherein each of the plurality of queues is an AAL2 queue.

26. The apparatus of claim 13, wherein each of the plurality of queues is an AAL2 queue.

27. The apparatus of claim 19, wherein each of the plurality of queues is an AAL2 queue.

* * * * *